United States Patent
Wu et al.

(10) Patent No.: US 8,234,260 B1
(45) Date of Patent: Jul. 31, 2012

(54) METADATA MANAGEMENT FOR SCALABLE PROCESS LOCATION AND MIGRATION

(75) Inventors: Yuguang Wu, Santa Clara, CA (US); Christopher A. Vick, San Jose, CA (US); Michael H. Paleczny, San Jose, CA (US); Olaf Manczak, Hayward, CA (US); Jay R. Freeman, Palo Alto, CA (US); Phyllis E. Gustafson, Pleasanton, CA (US)

(73) Assignee: Oracle America, Inc., Redwood City, CA (US)

( * ) Notice: Subject to any disclaimer, the term of this patent is extended or adjusted under 35 U.S.C. 154(b) by 1777 days.

(21) Appl. No.: 11/158,750

(22) Filed: Jun. 22, 2005

(51) Int. Cl.
*G06F 7/00* (2006.01)
*G06F 17/30* (2006.01)

(52) U.S. Cl. .................. 707/705; 707/758; 707/764

(58) Field of Classification Search .................. None
See application file for complete search history.

(56) References Cited

U.S. PATENT DOCUMENTS

| | | | |
|---|---|---|---|
| 7,089,561 B2 * | 8/2006 | Morrison et al. | 719/312 |
| 2006/0150189 A1 * | 7/2006 | Lindsley | 718/105 |

* cited by examiner

*Primary Examiner* — Mohammad Ali
*Assistant Examiner* — Angelica Ruiz
(74) *Attorney, Agent, or Firm* — Osha Liang LLP

(57) ABSTRACT

A method for metadata management for scalable processes, involving creating a process by a first home processor, wherein the process is associated with a process identification (ID), storing the processor ID and information identifying the first home processor in a global process look-up data structure (GPLD), requesting metadata associated with the process, searching the GPLD to obtain the first home processor of the process using the process ID, and retrieving the metadata associated with the process from the first home processor.

8 Claims, 6 Drawing Sheets

METADATA MANAGEMENT FOR SCALABLE PROCESS LOCATION AND MIGRATION

STATEMENT REGARDING FEDERALLY SPONSORED RESEARCH OR DEVELOPMENT

The present invention was made with the support of the government of the United States under contract NBCH020055 awarded by the Defense Advanced Research Projects Administration. The United States government may have certain rights in the present invention.

BACKGROUND

Conventionally, in large parallel and distributed systems, many processes/threads exist that need to be managed. Specifically, the control, execution, and migration of the processes need to be managed. Typically, programs or applications running on any of the processors in a large distributed and/or parallel system can start and/or use a very large number of processes.

In such systems, location of and access to process metadata (e.g., virtual-to-physical memory mappings, the process ID of a given process, where a process is being run, at what time the process started, what command the process is executing, etc.) can be a difficult task to manage because several processors may be attempting to access a given process's metadata at any time, or several processors may be searching for a process's metadata.

Traditionally, one method for managing processes in large multiprocessor systems uses a centralized approach. In such implementations, a central entity manages the resources, metadata, and other information associated with all the processes in the system. Using this method, a processor requesting metadata associated with a process requests metadata information for a process from the central entity using some identifying information associated with the process (e.g., a process ID). The central entity then responds to the request by providing the processor with the metadata associated with the process. In some cases, if all processes obtain information from one centralized entity, the centralized entity may become a bottleneck and cause performance issues to arise. Further, as the number of processes in the multiprocessor system increase, the central entity may have difficulty searching for the metadata information associated with a particular process.

SUMMARY

In general, in one aspect, the invention relates to a method for metadata management for scalable processes, comprising creating a process by a first home processor, wherein the process is associated with a process identification (ID), storing the processor ID and information identifying the first home processor in a global process look-up data structure (GPLD), requesting metadata associated with the process, searching the GPLD to obtain the first home processor of the process using the process ID, and retrieving the metadata associated with the process from the first home processor.

In general, in one aspect, the invention relates to a multiprocessor system for metadata management for scalable processes, comprising a first global process look-up data structure (GPLD), and a first home processor configured to create a first process, and populate the first GPLD with information identifying the first home processor and a first process ID associated with the first process.

In general, in one aspect, the invention relates to a computer system for metadata management for scalable processes, comprising a processor, a memory, a storage device, and software instructions stored in the memory for enabling the computer system under control of the processor, to create a process by a first home processor, wherein the process is associated with a process identification (ID), store the processor ID and information identifying the first home processor in a global process look-up data structure (GPLD), request metadata associated with the process, search the GPLD to obtain the first home processor of the process using the process ID, and retrieve the metadata associated with the process from the first home processor.

Other aspects of the invention will be apparent from the following description and the appended claims.

DETAILED DESCRIPTION

Figure 1:
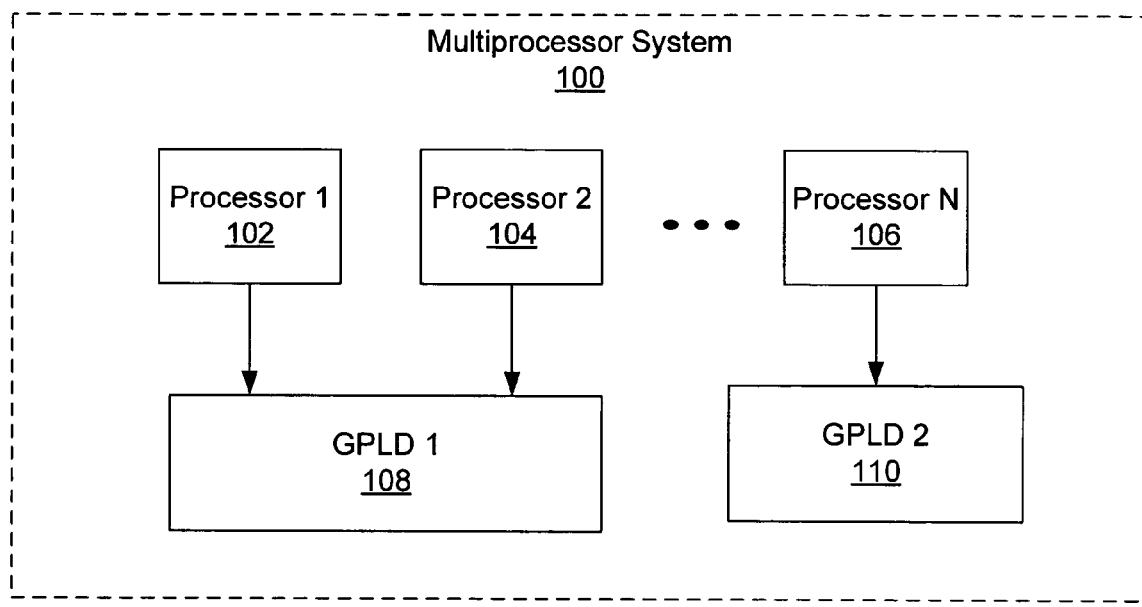
FIG. 1 shows a metadata management system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a distributed approach for managing processes in large parallel and/or distributed multiprocessor systems. Specifically, embodiments of the invention relate to using a distributed approach for providing control, execution, and migration of processes in large parallel and/or distributed multiprocessor systems. Further, embodiments of the invention relate to a method and apparatus for storing, updating and determining process metadata. More specifically, embodiments of the invention use a global process look-up data structure to locate metadata associated with different processes executing in the system.

FIG. 1 shows a multiprocessor system in accordance with one embodiment of the invention. Specifically, the multiprocessor system (100) shown in FIG. 1 includes several processors (i.e., Processor 1 (102), Processor 2 (104), Processor N (106)), and two global process look-up data structures (GPLDs) (i.e., GPLD 1 (108), GPLD 2 (110)). The GPLDs are described below in FIG. 2.

The processors (102, 104, 106) shown in the multiprocessor system (100) are configured to create processes for execution on the multiprocessor system (100). Further, when a processor (102, 104, 106) creates a process, the processor (102, 104, 106) includes functionality to obtain and assign a process identification (ID) to the process. In one embodiment of the invention, a processor that creates a process is known as the "home processor" of the process. The home processor is responsible for managing, updating, and providing access to metadata associated with one or more processes that the home processor creates. Specifically, in one embodiment of the invention, if a process is modified, the home processor is responsible for updating the metadata to reflect the changes to the modified process. For example, if a process is migrated to another area in memory, resulting in an address translation change (i.e., a change in the virtual-to-physical mappings of the process), then the home processor is responsible for updating the address translations associated with the migrated process.

In one embodiment of the invention, the home processor may store metadata for all the processes it creates locally. Alternatively, the home processor may store a pointer to the location where the metadata is stored. Metadata associated with a process may include, but is not limited to, process lifetime information, virtual-to-physical memory mappings of a process, status information associated with the process (e.g., running, stopped, ready, etc.), a pointer to checkpoints associated with the process, the home processor, the current running processor(s), etc.

As described above, the home processor of a process is responsible for updating metadata associated with a process when changes in the metadata occur. For example, in one embodiment of the invention, a process may be migrated from one processor to another processor, or from one area of memory to another area of memory, in the multiprocessor system. Migrating a process (and its threads) may involve changing the process's address translation (i.e., the virtual-to-physical memory mappings stored as part of the process's metadata). In this case, in one embodiment of the invention, the home processor of the migrated process would need to update the metadata associated with the process to reflect the changed address translation associated with the migrated process. However, the GPLD entry associated with the process (described in FIG. 2) does not need to change.

Those skilled in the art will appreciate that if the metadata associated with a process is replicated in more than one location, then the home processor is responsible for knowing the locations of the replicated metadata as well. However, the home processor, because it is the master processor, is still responsible for updating the metadata with any changes. Further, those skilled in the art will appreciate that the home processor of a process may or may not be located where the process's threads are executing.

Figure 2:
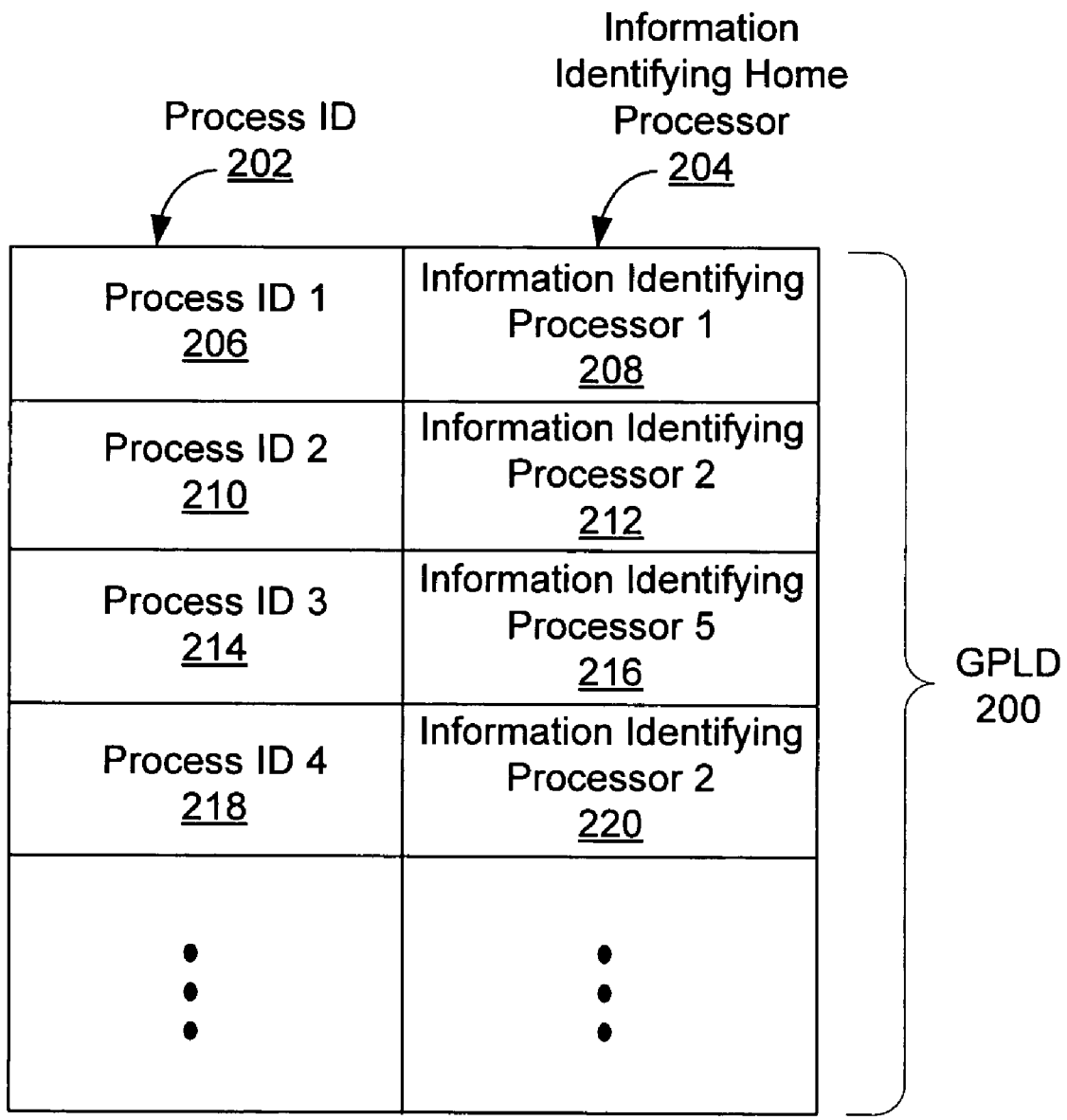
FIG. 2 shows a global process look-up data structure in accordance with one embodiment of the invention.

Because there may be several processes executing on the multiprocessor system (100) at a given time, each processor (102, 104, 106) may obtain metadata associated with a process using the GPLD (108, 110). FIG. 2 shows a GPLD (200) in accordance with one embodiment of the invention. In one embodiment of the invention, the GPLD (200) is a data structure that stores mappings of process IDs (202) to information identifying the home processor (204) of the process. In one embodiment of the invention, information identifying a home processor (204) may be a reference (e.g., a pointer) to the home processor. Alternatively, identifying information may correspond to the name of the home processor. Each mapping stored in the GPLD (200) may be referred to as a global process entry. Those skilled in the art will appreciate that the GPLD may be any look-up structure that stores a mapping of process IDs to information identifying the home processor of each process identified by the process IDs, such as a table, an array, etc.

Continuing with the description of FIG. 2, process ID 1 (206) is mapped to information identifying Processor 1 (208). This implies that Processor 1 is the home processor for the process identified by Process ID 1 (206). Process ID 2 (210) is mapped to information identifying Processor 2 (212), Process ID 3 (214) is mapped to information identifying Processor 5 (216), and Process ID 4 (218) is mapped to information identifying Processor 2 (212). Thus, one processor may be the home processor for more than one process. In one embodiment of the invention, if another processor needs metadata for the process identified by Process ID 1 (206), then the processor uses the information identifying the home processor associated with Process ID 1 (206) in the GPLD (200) to locate and contact Processor 1. In one embodiment of the invention, the processor may follow a pointer referencing Processor 1 to obtain metadata associated with the process identified by Process ID 1 (206). Alternatively, if the GLPD (200) stores the name of the home processor mapped to process IDs, then the processor may include functionality to contact the home processor using the name of the home processor.

Those skilled in the art will appreciate that the GLPD (200) may store different information identifying each home processor for different global process entries. For example, information identifying Processor 1 (208) in the GPLD (200) may be the name of Processor 1 and information identifying Processor 5 (216) in the GPLD (200) may be a pointer referencing Process 5. Further, those skilled in the art will appreciate that the process IDs may be assigned in sequential or a non-sequential manner, depending on how the processor obtains the process ID for each new process that is created.

Although FIG. 2 shows the GPLD (200) as storing mappings of process IDs with information identifying the home processor of a process, those skilled in the art will appreciate that FIG. 2 is not meant to limit the GPLD (200) to using only process IDs store information identifying the home processor of a process. Rather, the GPLD (200) may be structured in any manner that allows a processor to determine the home processor of a process. For example, when a new process is created, instead of assigning a process ID to the new process, a processor ID (i.e., an ID associated with the processor creating the process) may be used to structure the GPLD (200) into a functional look-up mechanism. Specifically, the processor ID may be manipulated (e.g., by adding on a unique set of bits, etc.), and the GPLD (200) may be organized based on a functional look-up using the manipulated processor ID.

Returning to FIG. 1, the GPLDs (108, 110) may reside at a fixed or relocateable central location, which is accessible by all the processors (102, 104, 106) in the multiprocessor system (100). Thus, each processor (102, 104, 106) knows where the nearest GPLD (108, 110) resides, and accesses the nearest GPLD (108, 100) using a process ID to obtain metadata associated with the process identified by the process ID. Alternatively, a given GPLD may be associated with a particular group of processors (102, 104, 106). In this case, a processor (102, 104, 106) may access a GLPD (108, 110) that is not the nearest GLPD (108, 110). Rather, the processor (102, 104, 106) may access the GLPD (108, 110) associated with the particular group of processors that the processor is part of.

Figure 5:
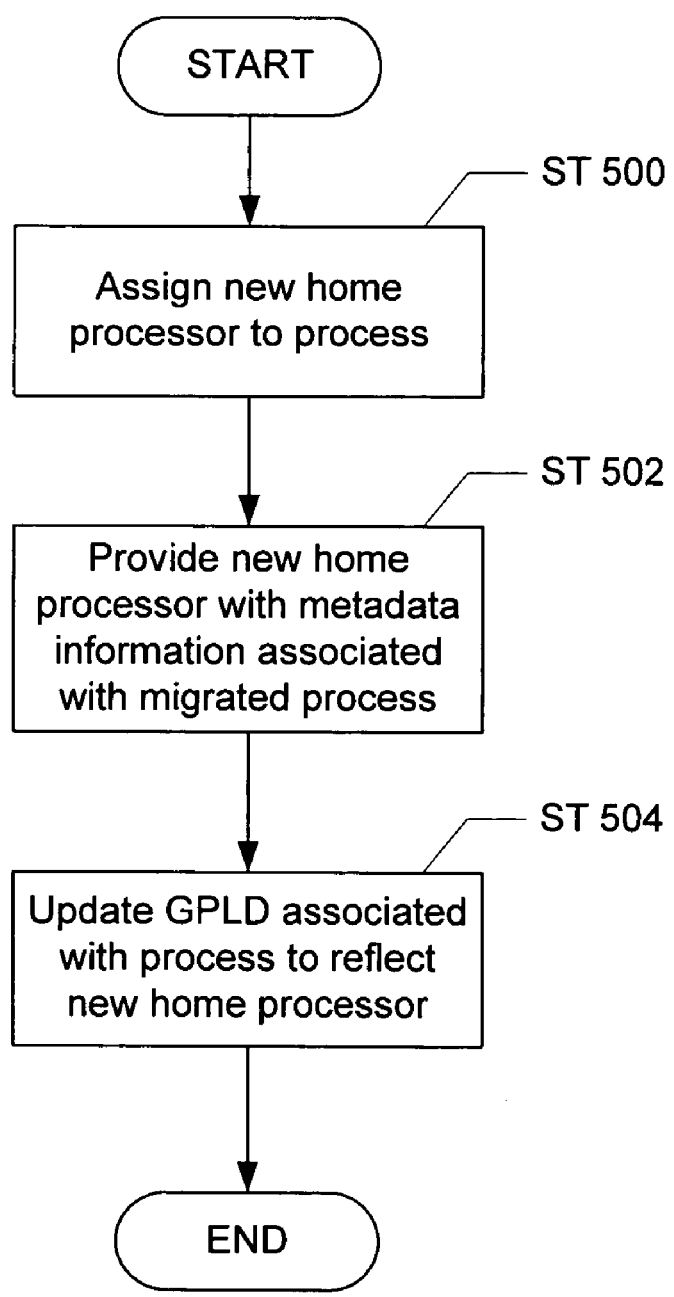
FIG. 5 shows a flow chart for migrating metadata to a new home processor in accordance with one embodiment of the invention.

In one embodiment of the invention, GPLD 1 (108) and GPLD 2 (110) are synchronized each time one of the GPLDs (108, 110) is updated with a global process entry for a new process or a change in the home processor of a process (See FIG. 5). Those skilled in the art will appreciate that as the number of processes created and executed in the multiprocessor system increase, additional GPLDs may be replicated to prevent one GPLD from becoming a bottleneck.

As described above, many processes may be created and managed in the multiprocessor system, resulting in an increase in the size of the GPLDs (108, 110). In one embodiment of the invention, GPLDs may be nested such that one GPLD contains a pointer to another GPLD located elsewhere in the system with additional mappings of process IDs to home processors. Those skilled in the art will appreciate that synchronization of GPLDs may also be performed on nested GLPDs.

Figure 3:
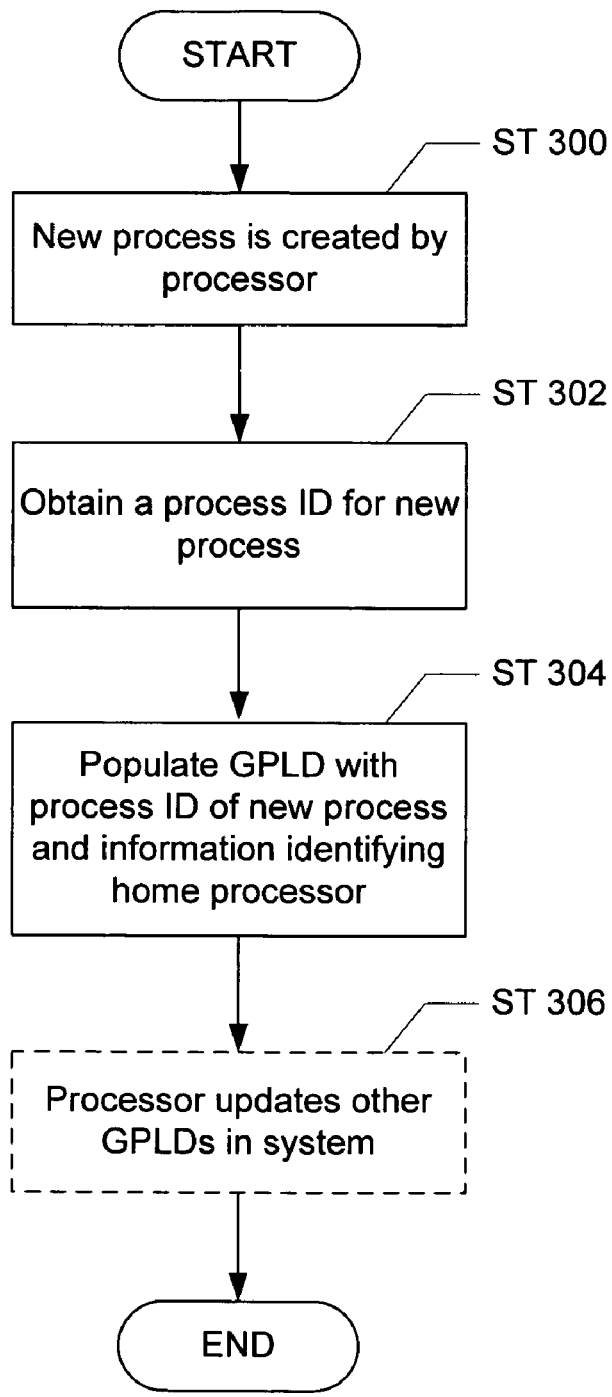
FIG. 3 shows a flow chart for populating a global process look-up data structure in accordance with one embodiment of the invention.

FIG. 3 shows a flow chart for populating a GPLD in accordance with one embodiment of the invention. Initially, a new process is created by a processor (Step 300). Subsequently, a process ID is obtained for the new process (Step 302). In one embodiment of the invention, a process may obtain the process ID for the new process by accessing the GPLD and determining the next sequential process ID to assign to the new process. For example, if the GPLD is populated with three process IDs (e.g., 100, 101, and 102), then a processor creating a new process may access the GPLD, determine the next sequential process ID (e.g., 103) and assign that process ID to the new process. Alternatively, a processor may obtain a process ID using a functional look-up mechanism, a random number generator, or any other method for obtaining a unique process ID.

Continuing with the discussion of FIG. 3, upon obtaining and assigning the process ID to the new process, the GPLD is populated with the process ID associated with the new process and information identifying a home processor of the process (e.g., a pointer to the home processor) (Step 304). In one embodiment of the invention, the GPLD may be populated by the home processor or any other processor in the multiprocessor system that includes (or has access to) the information necessary to populate the GLPD.

Those skilled in the art will appreciate that if multiple GPLDs exist in the multiprocessor system, then the GPLD nearest to the processor populating the GLPD is populated by the processor. Alternatively, the processor may populate the GPLD assigned to it, if a GPLD is distributed among a group of processors. At this stage, if multiple GPLDs exist in the multiprocessor system, the processor may update the other GPLDs (i.e., synchronize all the GPLDs in the system) with the information associated with the new process (Step 306). The dotted lines associated with Step 306 indicate that this step is optional, depending on whether more than one GPLD exists in the multiprocessor system.

Those skilled in the art will appreciate that the creation of a process may include obtaining a process ID and populating a GPLD. Thus, the creation of a process may be completed after the GPLD is populated with the process ID associated with the process and a pointer to the home processor of the process. Thus, upon completion of Steps 302-304, the home processor of a process may perform additional local functions to complete the creation of a process.

Figure 4:
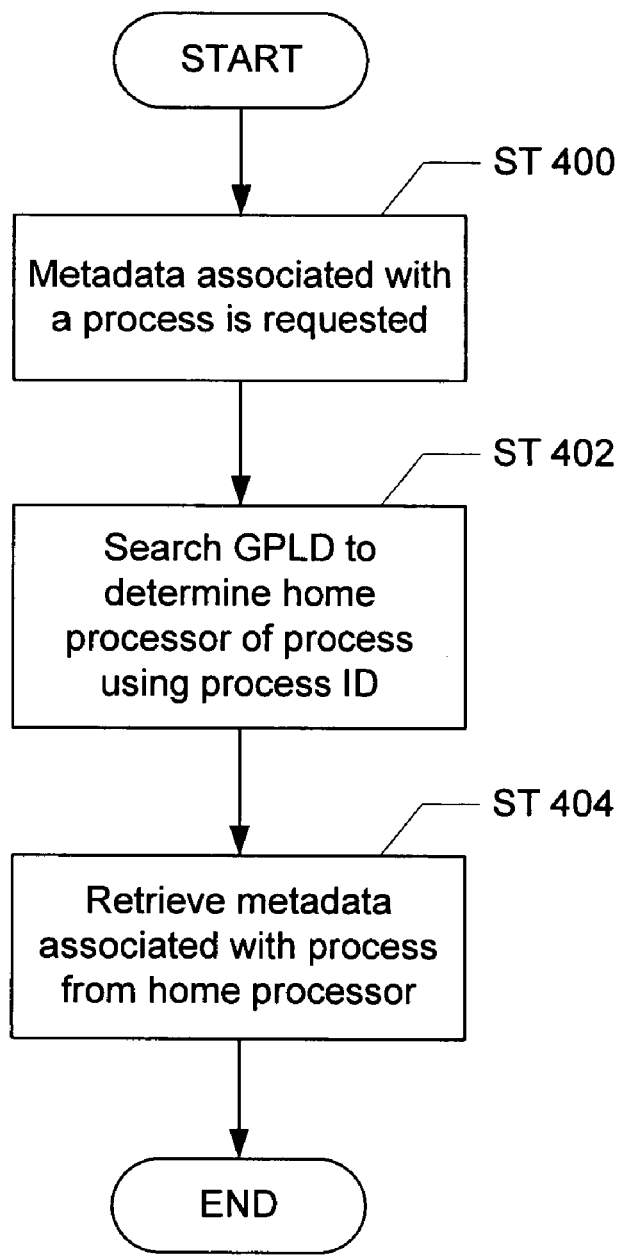
FIG. 4 shows a flow chart for obtaining process metadata in accordance with one embodiment of the invention.

FIG. 4 shows a flow chart for obtaining process metadata in accordance with one embodiment of the invention. Initially, a processor (or other system component) requests metadata associated with a process (Step 400). Subsequently, in one embodiment of the invention, the processor searches the GPLD using the process ID of the process to determine the home processor of the process (Step 402). In one embodiment of the invention, a processor may use the process ID as an input into a hash function to locate the appropriate entry for the process in the GPLD. Those skilled in the art will appreciate that several other methods may be used to index into the GPLD, e.g., a functional look-up structure, etc. Upon finding the process ID associated with the process in the GPLD, the processor may retrieve the metadata associated with the process from the home processor (Step 404).

As described above, the home processor is responsible for responding to metadata access requests from other processors. In one embodiment of the invention, the home processor may store the metadata associated with the process locally, in which case the home processor may provide the metadata to the processor requesting metadata of a process. Alternatively, the home processor may store a pointer to a location where the requested metadata of the process is stored (e.g., a pointer to some portion of memory in the multiprocessor system). In this case, the home processor may provide the requesting processor with the pointer to the location where the metadata is stored, and the requesting process may go to the location referenced by the pointer to obtain the requested metadata.

In one embodiment of the invention, once a requesting processor obtains metadata from the home processor, the requesting processor may replicate the metadata for the process to allow for improved performance. More specifically, if a processor is going to be using the metadata associated with a process often, then the processor may replicate the metadata obtained from a home processor locally, or in some portion of memory accessible by the processor. Thus, the processor has immediate access to the metadata, and does not need to access the GPLD or contact the home processor each time the metadata is used by the processor. However, in one embodiment of the invention, the replicated metadata is still managed and provided to other requesting processors by the home processor of the process (i.e., relevant process metadata is updated on the home processor).

FIG. 5 shows a flow chart for changing the home processor of a process in accordance with one embodiment of the invention. The management of a process may be moved from an original home processor to another home processor for load balancing reasons, if the original home processor fails, etc. For example, consider the scenario in which a particular processor creates many processes and is subsequently overloaded with access requests for metadata associated with the many processes created by the processor. In such a case, to achieve dynamic load-balancing, some of the processes may be assigned a different home processor.

Initially, a new home processor is assigned to manage a process (Step 500). In one embodiment of the invention, the new home processor is provided with all the metadata locally stored on the original home processor, and/or all the pointer(s) referencing the location(s) of the metadata of the process (Step 502). Those skilled in the art will appreciate that either the original home processor or the new home processor may initiate the transfer of metadata and/or references to the location of the metadata associated with the process being moved to the new home processor. Subsequently, the GPLD is updated to reflect the new home processor associated with the process (Step 504). Specifically, the pointer referencing the original home processor is updated to point to the new home processor. In the updated GPLD, the process ID associated with the process is mapped to the new home processor.

Figure 6:
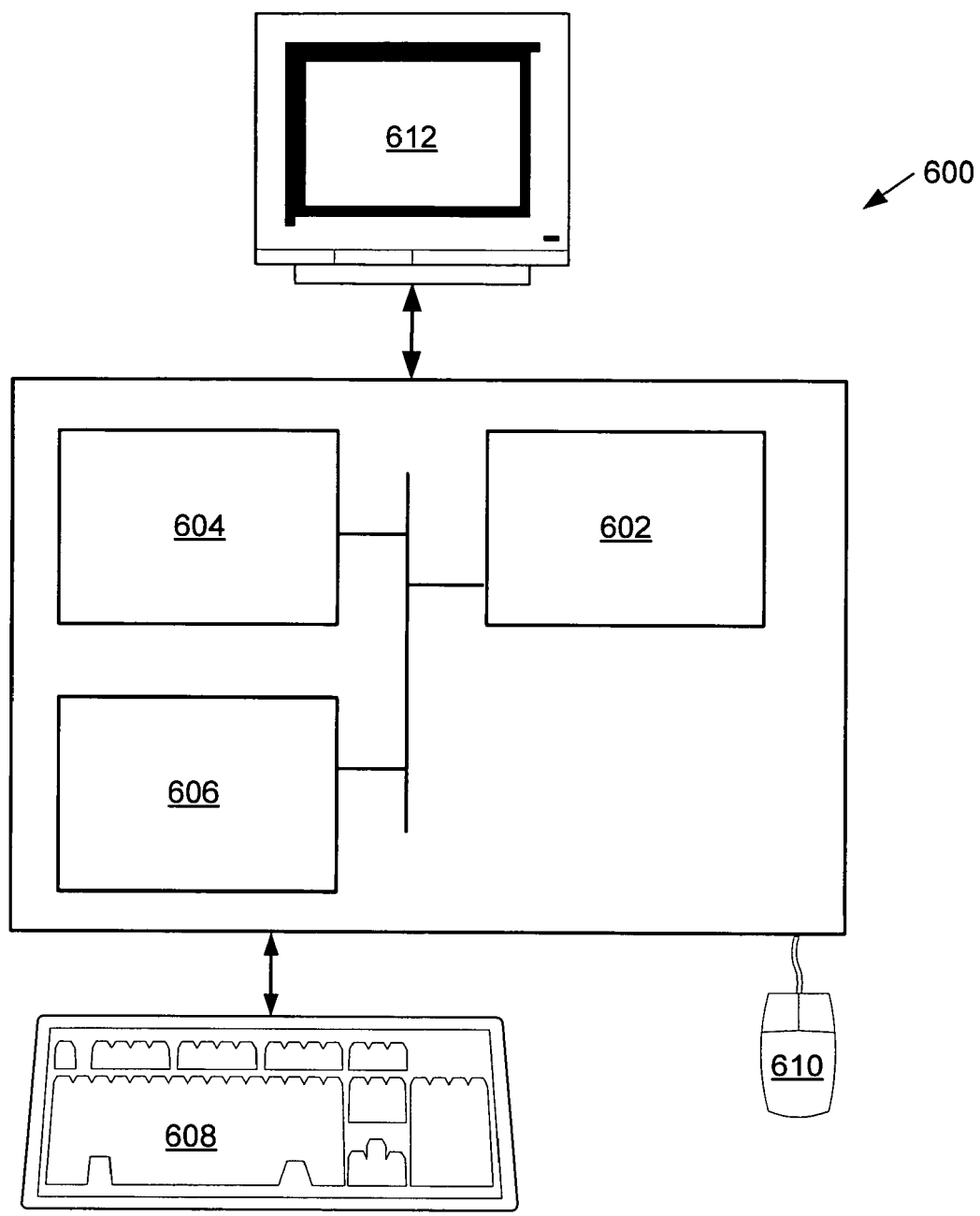
FIG. 6 shows a computer system in accordance with one embodiment of the invention.

One or more embodiments of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a scalable method for maintaining and managing processes in a multiprocessor system. Because each process is managed and accessed via the home processor associated with the process, the invention enables simple and efficient metadata management for processes in a large parallel or distributed system. Once the metadata of a process is obtained, multiple processors can look-up the address translation information or any other metadata associated with the process, providing a truly multi-threaded execution of the process.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for metadata management for scalable processes, comprising:
    creating and executing a process by a first home processor, wherein the process is associated with a process identification (ID);
    storing the process ID and information identifying the first home processor in a nearest physically located global process look-up data structure (GPLD) selected from a plurality of GPLDs, wherein the nearest physically located GPLD is shared among a plurality of home processors;
    requesting metadata associated with the process;
    searching the nearest physically located GPLD to obtain the first home processor of the process using the process ID;
    retrieving the metadata associated with the process from the first home processor;
    migrating the process from the first home processor to a second home processor, wherein the process is executed on the second home processor; and
    updating the nearest physically located GPLD, after the migration of the process to the second home processor, to indicate that the process is associated with the second home processor.

2. The method of claim 1, further comprising:
    obtaining the process ID for the process.

3. The method of claim 2, wherein obtaining the process ID for the process comprises determining the next sequential process ID using the one of the plurality of GPLDs.

4. The method of claim 1, further comprising:
    modifying the process to obtain a modified process; and
    updating the metadata associated with the modified process by the first home processor.

5. The method of claim 1, wherein retrieving the metadata associated with the process from the first home process comprises following a pointer stored in the first home processor.

6. The method of claim 1, wherein the metadata comprises at least one selected from the group consisting of information associated with a lifetime of the process, a virtual-to-physical memory mapping for the process, and a pointer to a checkpoint associated with the process.

7. The method of claim 1, wherein the information identifying the first home processor is a reference to the first home processor.

8. A computer system for metadata management for scalable processes, comprising:
    a processor;
    a memory;
    a storage device; and
    software instructions stored in the memory for enabling the computer system under control of the processor, to:
        create and execute a process by a first home processor, wherein the process is associated with a process identification (ID);
        store the process ID and information identifying the first home processor in a nearest physically located global process look-up data structure (GPLD) selected from a plurality of GPLDs, wherein the nearest physically located GPLD is shared among a plurality of home processors;
        request metadata associated with the process;
        search the nearest physically located GPLD to obtain the first home processor of the process using the process ID;
        retrieving the metadata associated with the process from the first home processor;
        migrating the process from the first home processor to a second home processor, wherein the process is executed on the second home processor; and
        updating the nearest physically located GPLD, after the migration of the process to the second home processor, to indicate that the process is associated with the second home processor.

* * * * *